(12) United States Patent
Michiels et al.

(10) Patent No.: US 10,567,159 B2
(45) Date of Patent: Feb. 18, 2020

(54) CMAC COMPUTATION USING WHITE-BOX IMPLEMENTATIONS WITH EXTERNAL ENCODINGS

(71) Applicant: NXP B.V., Eindhoven (NL)

(72) Inventors: Wilhelmus Petrus Adrianus Johannus Michiels, Reusel (NL); Jan Hoogerbrugge, Helmond (NL); Joppe Willem Bos, Wijgmaal (BE)

(73) Assignee: NXP B.V., Eindhoven (NL)

( * ) Notice: Subject to any disclaimer, the term of this patent is extended or adjusted under 35 U.S.C. 154(b) by 174 days.

(21) Appl. No.: 15/616,648

(22) Filed: Jun. 7, 2017

(65) Prior Publication Data

US 2018/0359081 A1  Dec. 13, 2018

(51) Int. Cl.
*H04L 9/06* (2006.01)
*H04L 9/32* (2006.01)

(52) U.S. Cl.
CPC .......... *H04L 9/0631* (2013.01); *H04L 9/0637* (2013.01); *H04L 9/0643* (2013.01); *H04L 9/3242* (2013.01); *H04L 2209/046* (2013.01); *H04L 2209/08* (2013.01); *H04L 2209/16* (2013.01); *H04L 2209/34* (2013.01)

(58) Field of Classification Search
CPC .......... H04L 9/0631; H04L 9/0637; H04L 2209/046; H04L 2209/08; H04L 2209/34; H04L 2209/16; H04L 9/0643; H04L 9/3242
See application file for complete search history.

(56) References Cited

U.S. PATENT DOCUMENTS

| | | | |
|---|---|---|---|
| 9,654,280 B2 * | 5/2017 | Michiels | H04L 9/002 |
| 2010/0098255 A1 * | 4/2010 | Ciet | H04L 9/0838 380/277 |
| 2012/0002807 A1 * | 1/2012 | Michiels | H04L 9/002 380/28 |
| 2014/0019771 A1 | 1/2014 | Emmett et al. | |
| 2015/0270949 A1 * | 9/2015 | Michiels | H04L 9/14 380/28 |
| 2016/0180066 A1 * | 6/2016 | Michiels | H04L 9/06 713/189 |
| 2016/0330019 A1 | 11/2016 | Michiels et al. | |
| 2016/0350520 A1 * | 12/2016 | Michiels | H04L 9/06 |
| 2017/0149559 A1 * | 5/2017 | Michiels | H04L 9/004 |
| 2017/0180119 A1 * | 6/2017 | Michiels | H04L 9/0819 |
| 2017/0286647 A1 * | 10/2017 | Michiels | G06F 21/10 |
| 2017/0373832 A1 * | 12/2017 | Wurcker | H04L 9/002 |
| 2018/0359082 A1 * | 12/2018 | Bos | H04L 9/002 |

OTHER PUBLICATIONS

M. Beunardeau, A. Connolly, R. Geraud and D. Naccache, "White-Box Cryptography: Security in an Insecure Environment," in IEEE Security & Privacy, vol. 14, No. 5, pp. 88-92, 2016. (Year: 2016).*

(Continued)

*Primary Examiner* — Michael R Vaughan

(57) ABSTRACT

A method for mapping an input message to a message authentication code (MAC) by a white-box implementation of a keyed cryptographic operation in a cryptographic system that includes using a white-box implementation of the block cipher in a MAC.

18 Claims, 5 Drawing Sheets

(56) References Cited

OTHER PUBLICATIONS

Joye, Marc; "On White-Box Cryptography;" Security of Information and Networks; Jan. 1, 2008; pp. 7-12; Retrieved from the internet: https://pdfs.semanticscholar.org/5fa1/db3012-85db7488c8f69aff3cdb4f2326eeec.pdf on Nov. 15, 2018.
Song, JH et al.; "The AES-CMAC Algorithm;" Informational Memo, Network Working Group; Jun. 2006; Retrieved from the Internet at http://www.rfc-editor.org/rfc/rfc4493.txt on Nov. 15, 2018.
Chow, et al., "A White-Box DES Implementation for DRM Applications", Proceedings of the 2nd ACM Workshop on Digital Rights Management, 1-15, 2002.
Chow, "White-box cryptography and an AES implementation, Selected Areas in Cryptography-SAC 2002", (Kaisa Nyberg and Howard M. Heys, eds. Lecture Notes in Computer Science, vol. 2696, 2003, 1-15.

\* cited by examiner

CMAC COMPUTATION USING WHITE-BOX IMPLEMENTATIONS WITH EXTERNAL ENCODINGS

TECHNICAL FIELD

Various exemplary embodiments disclosed herein relate generally to CMAC computations using white-box implementations with external encodings.

BACKGROUND

The Internet provides users with convenient and ubiquitous access to digital content. Because the Internet is a powerful distribution channel, many user devices strive to directly access the Internet. The user devices may include a personal computer, laptop computer, set-top box, internet enabled media player, mobile telephone, smart phone, tablet, mobile hotspot, or any other device that is capable of accessing the Internet. The use of the Internet as a distribution medium for copyrighted content creates the compelling challenge to secure the interests of the content provider. Increasingly, user devices operate using a processor loaded with suitable software to render (playback) digital content, such as audio and/or video. Control of the playback software is one way to enforce the interests of the content owner including the terms and conditions under which the content may be used. Previously many user devices were closed systems. Today more and more platforms are partially open. Some users may be assumed to have complete control over and access to the hardware and software that provides access to the content and a large amount of time and resources to attack and bypass any content protection mechanisms. As a consequence, content providers must deliver content to legitimate users across a hostile network to a community where not all users or user devices can be trusted.

Secure software applications may be called upon to carry out various functions such as, for example, cryptographic functions used to protect and authenticate digital content. In order to counter attacks, these algorithms have to be obfuscated (hidden) in order to prevent reverse engineering and modification of the algorithm or prohibit obtaining the user-specific secure information. Accordingly, the functions of the secure software application may be carried out by various functions as defined by the instruction set of the processor implementing the secure software. For example, one way to obscure these functions is by the use of lookup tables.

Content providers must deliver content to legitimate users across a hostile network to a community where not all users or devices can be trusted. This has led to the development of white-box cryptography. In the white-box cryptography scenario it is assumed that the user has complete control of the hardware and software that provides access to the content, and an unlimited amount of time and resources to attack and bypass any content protection mechanisms. The secure software code that enforces the terms and conditions under which the content may be used should be tamper resistant.

In various scenarios where cryptographic functions are implemented in software on a user device, the attacker has complete control of the software enforcing the management and access to the protected and cryptographic content. Accordingly, the attacker can modify software and also seek to obtain cryptographic keys used to encrypt and/or to authenticate the protected content. Such keys may be found by analyzing the software Regarding key distribution, a software user has to retrieve a cryptographic key (e.g., decryption, encryption, or authentication keys) from a license database in order to execute the software implemented cryptographic function. The user device then has to store this cryptographic key somewhere in memory in order to carry out the cryptographic equation. This leaves an attacker two options for an attack on the key. First, an attacker may reverse engineer the license database access function allowing the attacker to retrieve asset keys from all license databases. In this situation the attacker does not need to understand the internal working of the cryptographic function. Second, the attacker may observe accesses of the memory during content decryption, thus the attacker may retrieve the decryption key. In both cases the key is considered to be compromised.

The widespread use of secure software has given rise to the need for secure, tamper-resistant software that seeks to complicate tampering with the software. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the secure application, and consequently to change it.

As used herein, white-box cryptography includes a secure software application that performs cryptographic functions in an environment where an attacker has complete control of the system running the white-box cryptography software. Thus, the attacker can modify inputs and outputs, track the operations of the software, sample and monitor memory used by the software at any time, and even modify the software. Accordingly, the secure functions need to be carried out in a manner that prevents the disclosure of secret information used in the secure functionality. White-box cryptography functions may be implemented in various ways. Such methods include: obscuring the software code; using complex mathematical functions that obscure the use of the secret information; using look-up tables; using finite state machines; or any other methods that carry out cryptographic functions but hide the secret information needed for those secure functions. A white-box implementation may also contain components that include anti-debugging and tamper-proofing properties.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for mapping an input message to a message authentication code (MAC) by a white-box implementation of a keyed cryptographic operation in a cryptographic system, including: calculating $k_0 = H(E_k(0))$, where H is an encoding function, $E_k$ is a white-box implementation of a block cipher using a key $k$; calculating $k_1 = k_0 \ll 1$ when msb($k_0$)=0 or $k_1 = ENC_1(k_0 \ll 1)$ when msb($k_0$)=1 where $ENC_f$ is an encoding function; calculating $k_2 = k_1 \ll 1$ when msb($k_1$)=0 or $k_2 = ENC_2(k_1 \ll 1)$ when msb($k_1$)=1 where $ENC_2$ is an encoding function; dividing the input message into b-bit blocks $m = m_1 \| \ldots \| m_{n-1} \| m_n$ where $m_1, \ldots, m_{n-1}$ are complete blocks where b is an integer; calculating $m_n' = ENC_3(k_1 \oplus m_n)$ when $m_n$ is a complete block and $m_n' = ENC_3 k_2 \oplus (m_n \| 10 \ldots 0_2))$ when $m_n$ is an incomplete block where $ENC_3$ is an encoding function; calculating $c_i = Encrypt_i(c_{i-1} \oplus m_i)$ for $i = 1, \ldots, n-1$, where $c_0 = 00 \ldots 0_2$, $Encrypt_i(x) = F_{i/2+1}(E_k(x))$ when i is odd or $Encrypt_i(x) = (E_k(F_{i/2+1}^{-1}(x)))$ when i is even, and $F_i$ is an encoding function; calculating $c_n = E_k(G^{-1}(c_{n-1} \oplus m_n'))$; and outputting a portion of $c_n$.

Further various embodiments relate to a non-transitory machine-readable storage medium encoded with instructions for execution by a white-box implementation of a keyed cryptographic operation in a cryptographic system for mapping an input message to a message authentication code (MAC), including: instructions for calculating $k_0 = H(E_k(0))$, where H is an encoding function, $E_k$ is a white-box implementation of a block cipher using a key $k$; instructions for calculating $k_1 = k_0 \ll 1$ when msb($k_0$)=0 or $k_1 = ENC_1(k_0 \ll 1)$ when msb($k_0$)=1 where $ENC_1$ is an encoding function; instructions for calculating $k_2 = k_1 \ll 1$ when msb($k_1$)=0 or $k_2 = ENC_2(k_1 \ll 1)$ when msb($k_1$)=1 where $ENC_2$ is an encoding function; instructions for dividing the input message into b-bit blocks $m = m_1 \| \ldots \| m_{n-1} \| m_n$ where $m_1, \ldots, m_{n-1}$ are complete blocks where b is an integer; instructions for calculating $m_n' = ENC_3(k_1 \oplus m_n)$ when $m_n$ is a complete block and $m_n' = ENC_3 k_2 \oplus (m_n \| 10 \ldots 0_2))$ when $m_n$ is an incomplete block where $ENC_3$ is an encoding function; instructions for calculating $c_i = Encrypt_i(c_{i-1} \oplus m_i)$ for $i = 1, \ldots, n-1$, where $c_0 = 00 \ldots 0_2$, $Encrypt_i(x) = F_{i/2+1}(E_k(x))$ when i is odd or $Encrypt_i(x) = (E_k(F_{i/2+1}^{-1}(x)))$ when i is even, and $F_i$ is an encoding function; instructions for calculating $c_n = E_k(G^{-1}(c_{n-1} \oplus m_n'))$; and instructions for outputting a portion of $c_n$.

Various embodiments are described, wherein $G^{-1}$ compensates for the encoding H when n is odd.

Various embodiments are described, wherein $G^{-1}$ compensates for the encoding H and encoding $F_{n/2}$ when n is even.

Various embodiments are described, wherein the XOR in $c_n = E_k(G^{-1}(c_{n-1} \oplus m_n'))$ is implemented in the white-box implementation of $E_k$.

Various embodiments are described, wherein the XOR in $c_i = Encrypt_i(c_{i-1} \oplus m_i)$ is implemented in the white-box implementation of $E_k$.

Various embodiments are described, wherein $H(x) = x \oplus r_0$, where $r_0$ is a random number.

Various embodiments are described, wherein $F_i(x) = x \oplus r_i$, where $r_i$ is a random number.

Various embodiments are described, wherein when n is even G is $r_{n/2} \oplus R$, where $R = r_0'$ when $m_n$ is a complete block or $R = r_0''$ when $m_n$ is an incomplete block, where $r_0'$ is the masking on $k_1$ due to the encoding H and where $r_0''$ is the masking on $k_2$ due to the encoding H.

Various embodiments are described, wherein when n is odd G is $r_0'$ when $m_n$ is a complete block or $r_0''$ when $m_n$ is an incomplete block, where $r_0'$ is the masking on $k_1$ due to the encoding H and where $r_0''$ is the masking on $k_2$ due to the encoding H.

BRIEF DESCRIPTION OF THE DRAWINGS

In order to better understand various exemplary embodiments, reference is made to the accompanying drawings, wherein.

DETAILED DESCRIPTION

Figure 1:
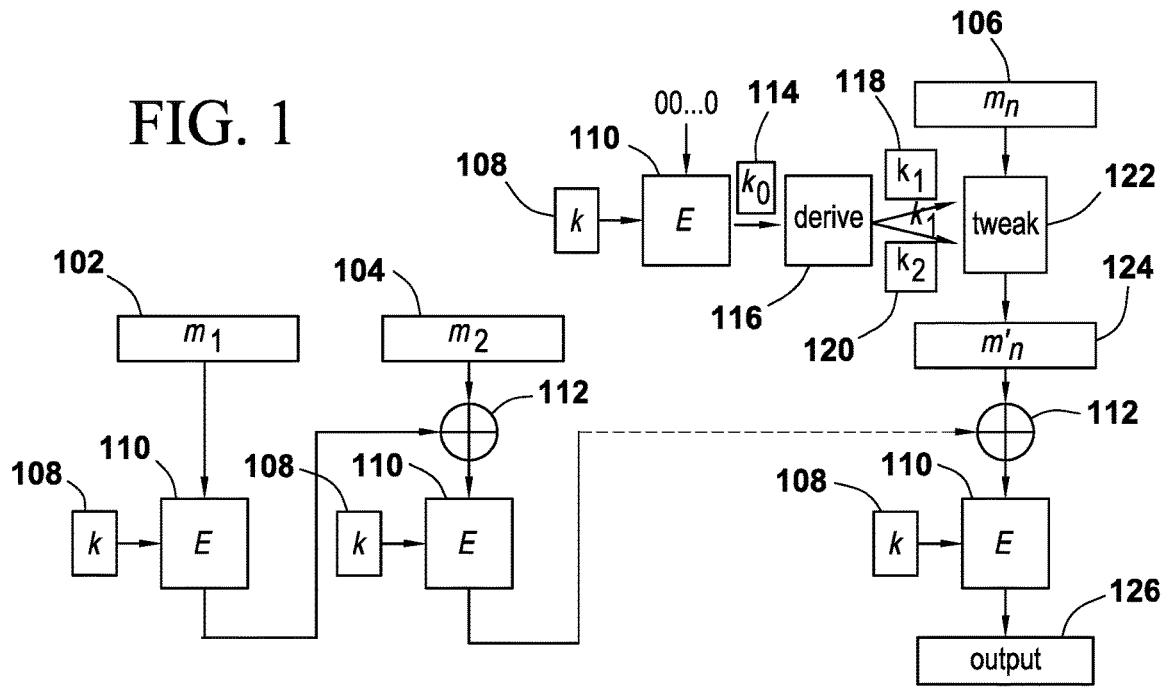
FIG. 1 depicts the CMAC.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented. While the description of embodiments below are directed to software implementation running on a processor, it is noted that these embodiments may also be partially or completely implemented in hardware as well. The lookup tables and finite state machines that are described may be implemented in hardware to carry out the various functions described.

A table-based approach to a white-box implementation of the Advanced Encryption Standard (AES) and the Data Encryption Standard (DES) were proposed in the following papers: "White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1"; and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002, referred to hereinafter as "Chow 2". Chow 1 and Chow 2 disclose methods of using a table-based approach to hide the cryptographic key by a combination of encoding its tables with random bijections, and extending the cryptographic boundary by pushing it out further into the containing application.

As noted, for many cryptographic operations it is desired to have a white-box implementation. The invention may be applied, for example, to symmetric and asymmetric cryptographic operations. Also, the invention may be applied to block ciphers, stream ciphers, message authentication schemes, signature schemes, etc. Well known block ciphers include: Advanced Encryption Standard (AES), Secure And Fast Encryption Routine, (SAFER, and variants SAFER+ and SAFER++), Blowfish, Data Encryption Standard (DES), etc. A well-known stream cipher is RC4. Moreover any block cipher can be used as stream cipher using an appropriate mode of operation, e.g., Cipher feedback (CFB), Counter mode (CTR), etc.

The input message can represent encrypted or other content data, such as multi-media data, including audio and/or video data. The encrypted content data may also include encrypted software, e.g., encrypted computer code representing some computer application, e.g., a computer game, or an office application. The input message may also represent a key for use in a further cryptographic operation. The latter may be used, for example, in a key exchange protocol, wherein a white-box implementation according to the invention encrypts and/or decrypts data representing a new key. The input data may also be plain data, for example, plain user data. The latter is especially advantageous in message authentication schemes. A white-box implementation according to the invention may have the property that the implementation may only be used for encryption, only be used for decryption, but not for both. For example, this property can be achieved if the implementation uses look-up tables which are not bijective, for example, a look-up table having more input bits than output bits. Accordingly, if a user only has a white-box decryptor, the user may verify a MAC code but not create new MACs. This strengthens the non-repudiation properties of such a message authentication scheme.

The white-box implementation may be implemented using a plurality of basic blocks. The plurality of basic blocks is interconnected, in the sense that some of the blocks build on the outputs of one or more of the previous blocks. A basic block may be implemented in hardware, for example, as a computer chip. A basic block may use a switch board, a state machine or any other suitable construction for implementing functions in computer hardware. A basic block may also be implemented in software running on a general purpose computer chip, e.g. a microprocessor. For example, a basic block may use a plurality of computer instructions, including arithmetical instructions, which together implement the functionality of the basic block. A widely used implementation for the basic block, which may be used both in software and hardware, is a look-up table.

For example, Chow 1 and Chow 2 take this approach to implement the AES and DES block ciphers. A look-up table implementation includes a list which lists for possible input values, an output value. The input value may be explicit in the lookup table. In that situation the look-up table implementation could map a particular input to a particular output by searching in the list of input values for the particular input. When the particular input is found the particular output is then also found. For example, the particular output may be stored alongside the particular input. Preferably, the input values are not stored explicitly, but only implicitly. For example, if the possible inputs are a consecutive range, e.g. of numbers or bit-strings, the look-up table may be restricted to storing a list of the output values. A particular input number may, e.g., be mapped to the particular output which is stored at a location indicated by the number. Further, finite state machines or code obfuscation may be used to implement the white-box implementation.

For example, a look up table for a function may be created by computing the output value of the function for its possible inputs and storing the outputs in a list. If the function depends on multiple inputs the outputs may be computed and stored for all possible combinations of the multiple inputs. Look-up tables are especially suited to implement non-linear functions, which map inputs to output in irregular ways. A white-box implementation can be further obfuscated, as is explained below, by applying to one or more of its look-up tables a fixed obfuscating input encoding and a fixed output encodings. The results of applying a fixed obfuscating input encoding and output encodings is then fully pre-evaluated. Using this technique, a look-up table would be replaced by an obfuscated look-up table which has the same dimensions, that it takes the same number input bits and produces the same number of output bits. The input encoding and output encoding used in such obfuscation are not explicit in the final white-box implementation.

The network of basic blocks are arranged to compute an output message when they are presented with an input message. Typically, the input message is operated upon by a number of basic input blocks. A number of further basic blocks may take input from one or more of the basic input blocks and/or from the input. Yet further basic blocks can take input in any combination of the input message, the output of basic input blocks and the output of the further basic blocks. Finally some set of basic exit blocks, i.e., at least one, produce as output all or part of the output-message. In this manner a network of basic blocks emerges which collectively computes the mapping from the input message to output message.

The key used may be a cryptographic key and may contain sufficient entropy to withstand an anticipated brute force attack. It is noted that in a white-box implementation, the key is typically not explicitly present in the implementation. This would risk the key being found by inspection of the implementation. Typically, the key is only present implicitly. Various ways are known to hide a key in a cryptographic system. Typically, at least the method of partial evaluation is used, wherein a basic block which needs key input is evaluated in-so-far that it does not depend on the input-message. For example, a basic operation wherein an input-value, a masking value, which does not depend on the input-message, e.g. a value from a substitution box (S-box), and a key-value need to be XORed can be partially evaluated by XORing the key value and the masking value together beforehand. In this way the operation still depends on the key-value although the key-value is not explicitly present in the implementation. Instead, only the XOR between the key-value and masking-value is present in the implementation. Note that, more complicated ways and/or further ways of hiding the keys are compatible with embodiments of this invention.

Even if a white-box implementation achieves its goal of hiding the key perfectly, this still leaves an attacker the option to misuse the functionality of the key. For instance, he can lift the white-box implementation out of the containing application and use it outside of its context. This problem was already pointed out by Chow et al. [1,2] in their first publications on white-box cryptography. To address this issue, they introduced external encodings. This means that instead of implementing a cryptographic algorithm Enc, the white-box implementation implements a function $G \circ Enc \circ F^{-1}$. That is, it assumes an input that is encoded by F and instead of computing the output of Enc directly, it computes this output with an output encoding G put on top of it. The encoding of the input and the decoding of the output is done elsewhere in the program. Hence, lifting the white-box implementation out of its application has little to no value without knowing the encoding function F and G. We note that F and G need not both be present. We can also glue the white-box to the application by using only F or only G.

The use of external encodings may work reasonably well if the implemented cryptographic algorithm is an encryption or decryption algorithm that needs to protect the confidentiality of data. In that case, the attacker does not know what the input or output of the cryptographic algorithm is. This makes it more difficult to find the external encodings, although these are relatively weak compared to the strength of the cryptographic algorithm. If, on the other hand, the cryptographic algorithm is used in a MAC to protect the integrity of data, then the attacker typically knows what the input and output of the algorithm is. This gives the attacker black box access—i.e., access to the input-output values—of the external encodings. Hence, here the external encodings are less effective.

This yields a challenge in case that the white-box implementation that we want to glue to the surrounding program implements the same key and cryptographic algorithm as is done in the MAC computation. In that case, the implementation used in the MAC, and which does not have an external encoding, can be lifted out of the code and used instead of the one that has been glued to the application. The embodiments disclosed herein describe a method for solving this problem for the CMAC algorithm. More concretely, an implementation of a CMAC using white-box implementations that has an external encoding is proposed without the complete CMAC having an external encoding.

FIG. 1 depicts the CMAC. For n blocks $m_1, m_2, \ldots, m_n$ (102, 104, 106), the CMAC executes a cryptographic algorithm n+1 times, each time with the same key k 108. Let B be the block size of the encryption algorithm. For example, in case of AES B equals 16 bytes.

The blocks are encrypted using the CBC (Cipher Block Chaining) mode of operation. There are multiple encryption blocks E 110 that are chained together. The first encryption block E 110 takes the encryption key k 108 and the first message block $m_1$ 102 as inputs, and outputs an encryption of the first message block $m_{1i}$ 102 using the encryption key k 108. This output is then XORed 112 with the second message block $m_2$ 104. The output of the XOR 112 is then encrypted by the second encryption block E 110 using encryption key k 108. This process repeats until the second to last block. The last block is handled differently. A string of 0's is input to the encryption block E 110 to produce a value $k_0$ as described below. Then values $k_1$ and $k_2$ are computed as $$k_0 = AES_k(0)$$

$$k_1 = \begin{cases} k_0 \ll 1 & \text{if } msb(k_0) = 0 \\ (k_0 \ll 1) \oplus C & \text{if } msb(k_0) = 1 \end{cases}$$

$$k_2 = \begin{cases} k_1 \ll 1 & \text{if } msb(k_1) = 0 \\ (k_1 \ll 1) \oplus C & \text{if } msb(k_1) = 1 \end{cases}$$

Hence, the value 0 is encrypted to next obtain $k_1$ 118 and $k_2$ 120 by applying left-shifts and possibly additions—that is, XORs—with a constant 116. If the last block $m_n$ does not need padding, $k_1$ is added. Otherwise, the padding is first done and then $k_2$ is added. The message $m'_n$ 124 which is used in the CBC computation is calculated as follows:

$$m'_n = \begin{cases} m_n \oplus k_1 & \text{if } |m_n| = B \\ padded(m_n) \oplus k_2 & \text{if } |m_n| < B \end{cases}$$

The value $m'_n$ is then input into the XOR and the output of the XOR is input to encryption block E 110 as before.

Figure 2:
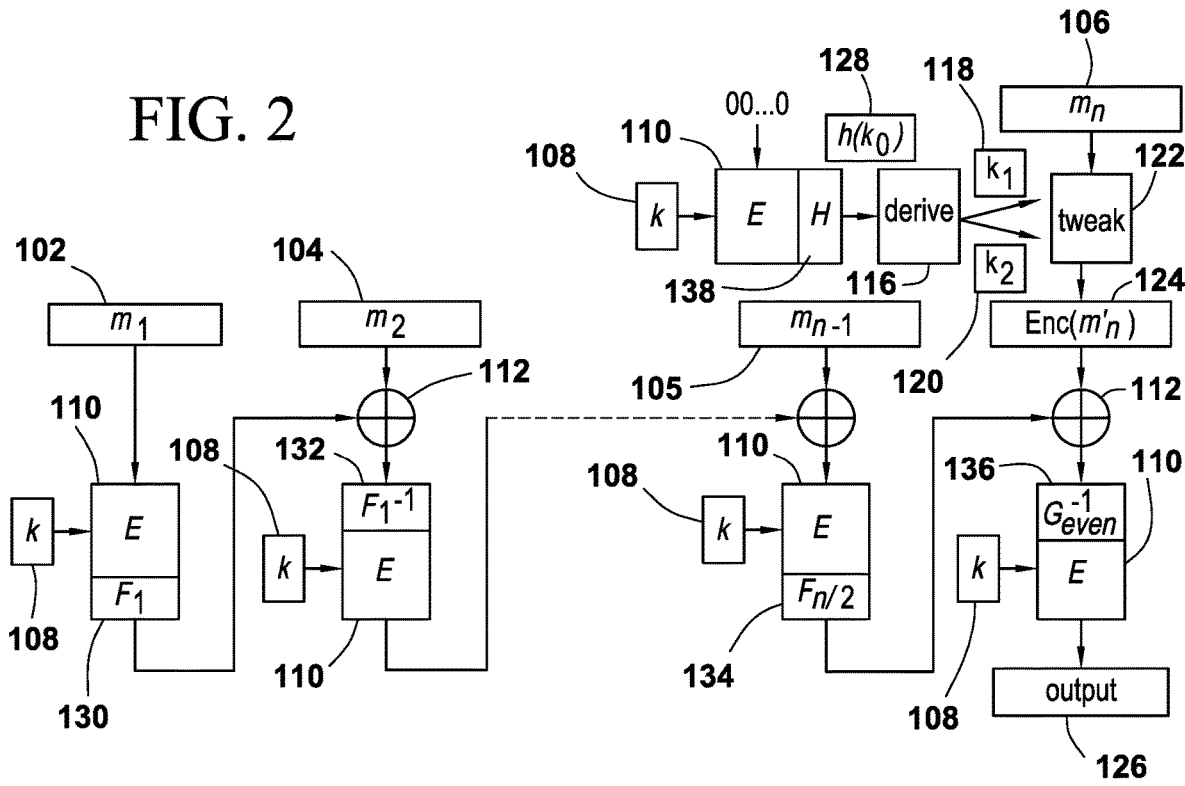
FIG. 2 illustrates a white-box implementation of the CMAC when there are an even number of blocks.
Figure 3:
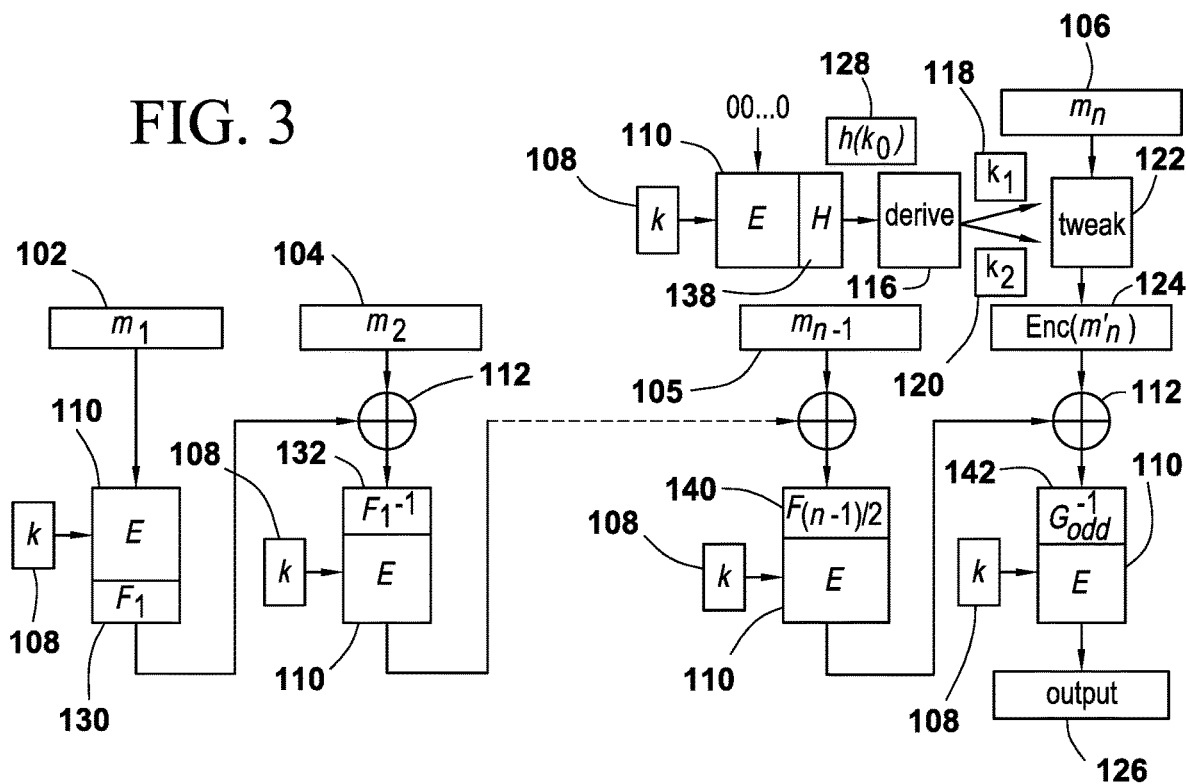
FIG. 3 illustrates a white-box implementation of the CMAC when there are an odd number of blocks.

The features of embodiments are shown in FIGS. 2 and 3. It includes the following aspects:

1) All encryption blocks E 110 are implemented by a white-box implementation. In the figures this is denoted by the thick-lined box around the encryption algorithms.
2) In the CBC chain, an external encoding is alternatively applied on the output and on the input of the encryption blocks E 110. For example, as illustrated in FIG. 2, external encoding $F_1$ 130 is applied on the output of a first encryption block E 110, and external encoding $F_{n/2}$ 134 is applied on the output of a third encryption block E 110, which the second to last block in FIG. 2. When there is an even number of blocks (FIG. 2), this means that the second last block has an output encoding. Otherwise, the second last block has no output encoding as shown in FIG. 3. Except for the last encryption block, an external output encoding matches the external input encoding of the next encryption algorithm. External output encoding $F_1$ 130 is removed after XOR 112 and before the next encryption block E 110 with external input encoding $F_1^{-1}$ 132. The last encryption block E 110 has the external input encoding $G_{even}^{-1}$ 136 placed on top of it after the last XOR 112, to produce an encoding output 126.
3) The value $k_0$ is computed with a white-box implementation that has an external encoding H 138 on its output.
4) As a result of encoding $k_0$ 128, the message $m'_n$ is encoded as well 124. The input decoding 136 integrated in the last white-box implementation of the encryption block E 110 compensates for this. In case when n is odd, this input decoding also compensates for the output encoding that is put on the output of the previous encryption in the CBC chain.

In other embodiments, the removal of the encoding $F_i$ may be done before the XOR instead of after the XOR. This may be accomplished by integrating the XORs preceding the white-box implementation into the white-box implementation. In this situation the white-box implementation of the encryption block E 110 received two inputs: the encrypted message computed by the previous white-box implementation and a plain input.

Now a description of how to implement a white-box implementation an encryption operation will be described. Specifically, below white-box embodiments are described using the AES (Advanced Encryption Standard) block cipher, because AES has become a widely used standard for block ciphers. Other white-box implementations of block ciphers may also be used in the CMAC described above.

AES is a block cipher with a block size of 128 bits or 16 bytes. The plaintext is divided in blocks of 16 bytes which form the initial state of the encryption algorithm, and the final state of the encryption algorithm is the cipher text. At any given point in the encryption algorithm these 16 bytes are the state of the encryption algorithm. To conceptually explain AES, the bytes of the state are organized as a matrix of 4×4 bytes. AES includes a number of rounds, which depend on the key size. Each round includes similar processing steps operating on bytes, rows, or columns of the state matrix, each round using a different round key in these processing steps. In the discussion using AES as an example, it is noted that AES defines a round in a specific manner. In the embodiments below, a round is any grouping of steps that includes at least one non-linear mapping function, such as an S-box in AES. Accordingly, a round as described below includes one non-linear mapping function and any combination of other steps of the cryptographic function. Further, the boundary of the round may start with the non-linear mapping function, for example an S-box, or any other operation that may be merged with the non-linear mapping function, for example a key addition.

Figure 4:
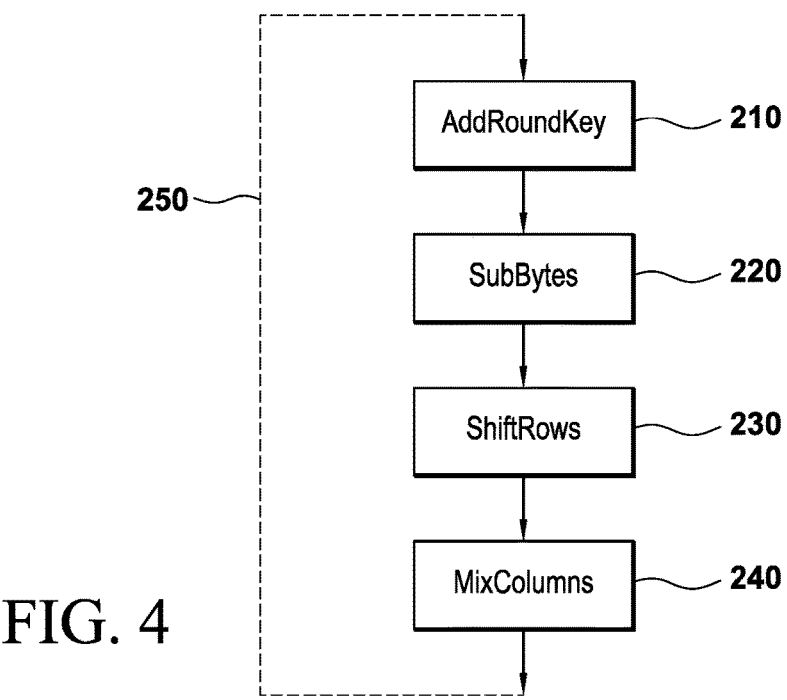
FIG. 4 illustrates some main processing steps of a round of AES

FIG. 4 illustrates some main processing steps of a round of AES. The processing steps include:
 AddRoundKey 210—each byte of the state is XORed with a byte of the round key;
 SubBytes 220—a byte-to-byte permutation using a lookup table;
 ShiftRows 240—each row of the state is rotated a fixed number of bytes; and
 MixColumns 250—each column is processed using a modulo multiplication in $GF(2^8)$.

The steps SubBytes 220, ShiftRows 230, and MixColumns 250 are independent of the particular key used. The key is applied in the step AddRoundKey 420. Except for the step ShiftRows 240, the processing steps can be performed on each column of the 4×4 state matrix without knowledge of the other columns. Therefore, they can be regarded as 32-bit operations as each column consists of four 8-bit values. Dashed line 250 indicates that the process is repeated until the required number of rounds has been performed.

Each of these steps or a combination of steps may be represented by a lookup table or by a network of lookup tables. If the AddRoundKey 210 step is implemented by XORing with the round key, then the key is visible to the attacker in the white-box attack context. The AddRoundKey 210 step can also be embedded in lookup tables, which makes it less obvious to find out the key. In fact, it is possible to replace a full round of AES by a network of lookup tables. For example, the SubBytes 220, ShiftRows 230, and MixColumns 250 steps may be implemented using table lookups. Below a possible white-box implementation of AES in sufficient detail is discussed to describe the embodiments of the invention below, but further detailed descriptions of such an implementation are found in Chow 1. Also, other variations in the lookup table implementation may be used which are within the scope of the invention.

Figure 5:
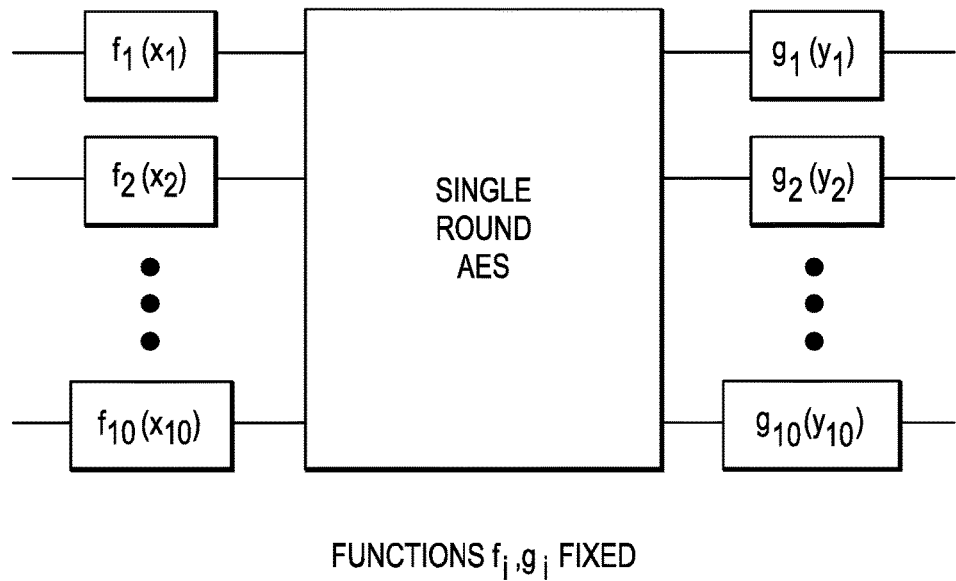
FIG. 5 illustrates a white-box AES implementation with fixed encodings on the input of the rounds.

Both the table-based white-box implementations and the finite state machine implementations have the property that all intermediate values in the implementation are encoded (as compared to a standard implementation). Examples of white-box implementations using finite state machines are disclosed in U.S. Patent Publication 2007/0014394 entitled "Data Processing Method" and a presentation at the Re-trust Sixth Quarterly Meeting entitled "Synchrosoft MCFACT-TM Secure Data Processing Technology" by Wulf Harder and Atis Straujums dated Mar. 11, 2008, which each are hereby incorporated by reference for all purposes as if fully set forth herein. FIG. 5 illustrates a white-box AES implementation with fixed encodings on the input of the rounds, i.e., on the input of the S-boxes. As shown, each of the 16 input bytes are encoded by $f_i$ and each of the output bytes are encoded by $g_i$.

In order to describe embodiments of the invention, a basic description of a table-based white-box AES implementation will be described. For a more detailed description of a method for implementing a table-based white-box AES see Chow 1. Chow 1 illustrates a specific implementation that breaks up certain functions using tables of specified sizes. It is well understood that various other divisions of the tables may be made resulting in different functions for the look-up tables and different sizes. Further, while the embodiments of the invention described below use a table-based white-box implementation of AES, other ciphers and cryptographic functions may be implemented according to the embodiments described. Also, other types of white-box implementations may be used instead of the table-base implementation, for example, a finite-state implementation.

The description of the table-based white-box AES is split into two steps. In the first step, a round of AES is described as a network of lookup tables. In the second step, the tables are obfuscated by encoding their input and output.

Step 1: Implementing AES as a Network of Lookup Tables.

AES operates on data blocks of 16 bytes. These are typically described as a 4×4 byte matrix, called the state including bytes $x_{1,1}, x_{1,2}, x_{1,3}, \ldots x_{4,4}$. A round of AES as described above with respect to FIG. 4 include the following operations: AddRoundKey 210, SubBytes 220, ShiftRows 230, and MixColumns 240. The first two operations, AddRoundKey and SubBytes can be merged into a single T-box operation. That is, we can define a byte-to-byte function $T_{i,j}$ for input byte $x_{i,j}$ as $T_{i,j}(x_{i,j})=S(x_{i,j} \oplus k_{i,j})$ where $k_{i,j}$ is a single byte of a 16 byte round key based upon the AES key. Let $y_{i,j}$ be the output of $T_{i,j}$. The ShiftRows operations is just an index-renumbering of the output bytes $y_{i,j}$. For ease of presentation, this operation is omitted in this description, but may be incorporated into the look-up table implementing $T_{i,j}$ or implemented as a separate manipulation of the state matrix. In the MixColumns step, an output byte $z_{i,j}$ of the round is computed from the 4 output bytes $y_{1,j}, y_{2,j}, y_{3,j},$ and $y_{4,j}$ via the algebraic expression $z_{l,j}=MC_{l,1} \cdot y_{1,j} \oplus MC_{l,2} \cdot y_{2,j} \oplus MC_{l,3} \cdot y_{3,j} \oplus MC_{l,4} \cdot y_{4,j}$ in $GF(2^8)$ for some constants $MC_{l,r}$.

Now define a lookup table for each byte-to-byte function $Q_{i,j,l}(x_{i,j})=MC_{l,i} \cdot T_{i,j}(x_{i,j})$ with i, j, l=1, 2, ..., 16. Then any output byte $z_{l,j}$ may be computed by XORing the results of these lookup tables, i.e., $z_{l,j}=Q_{1,j,l}(x_{1,j}) \oplus Q_{2,j,l}(x_{2,j}) \oplus Q_{3,j,l}(x_{3,j}) \oplus Q_{4,j,l}(x_{4,j})$. Note that the index i, j, l of Q-box can be interpreted as "the contribution of input byte i, j of a round to output byte l, j of the round".

The XOR may be alternatively implemented to operate on each of two nibbles (i.e., 4-bit values) as a lookup table to reduce the size of the XOR tables. Accordingly, the Q-box may be implemented to produce output nibbles so that the size of the tables is reduced. Therefore, the computation of each output byte $z_{i,j}$ of an AES-round has been described as a network of lookup tables. The network of lookup tables to compute a single output nibble of byte $z_{2,3}$ is shown in FIG. 6.

Figure 6:
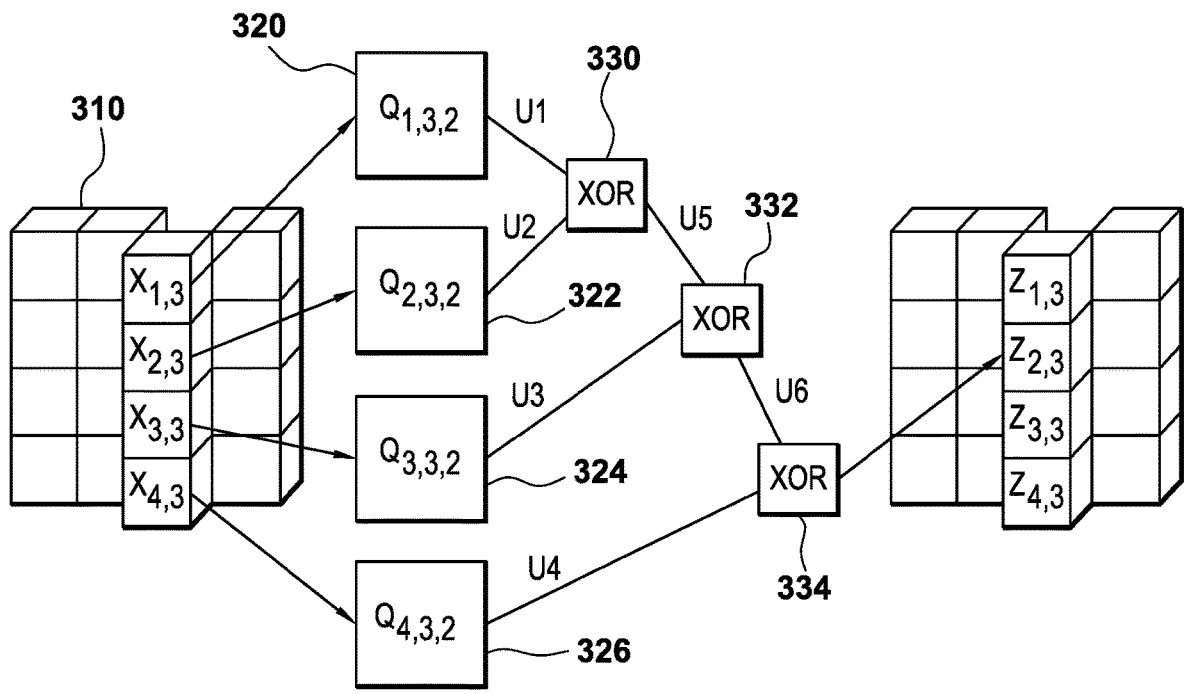
FIG. 6 illustrates the computation of one output byte by means of a network of look-up tables.

FIG. 6 illustrates the computation of one output byte by means of a network of look-up tables. A set of input bytes $x_{1,3}$, $x_{2,3}$, $x_{3,3}$, and $x_{4,3}$ in the input state 310 are input into the Q-boxes 320, 322, 324, 326. The outputs $u_1$, $u_2$ of lookup tables 320 and 322 are fed into the XOR 330, and the outputs $u_3$, $u_5$ of lookup table 324 and XOR 330 are fed into the XOR 332. The outputs $u_4$, $u_6$ of table 326 and XOR 332 are fed into XOR 334. The output of XOR 334 is the first nibble of the output $z_{2,3}$ of output state 340. The Q-boxes may also be split into two Q-boxes that operate on two nibbles instead of the whole byte. This may be done by using additional Q-boxes along with a similar XOR network.

Further, additional sets of tables may be implemented to completely convert the input state 310 into the output state 340 by receiving a column of bytes from the input state and converting them into the output of the corresponding column of the output state.

Step 2: Obfuscating the Tables and the Intermediate Values

Figure 7:
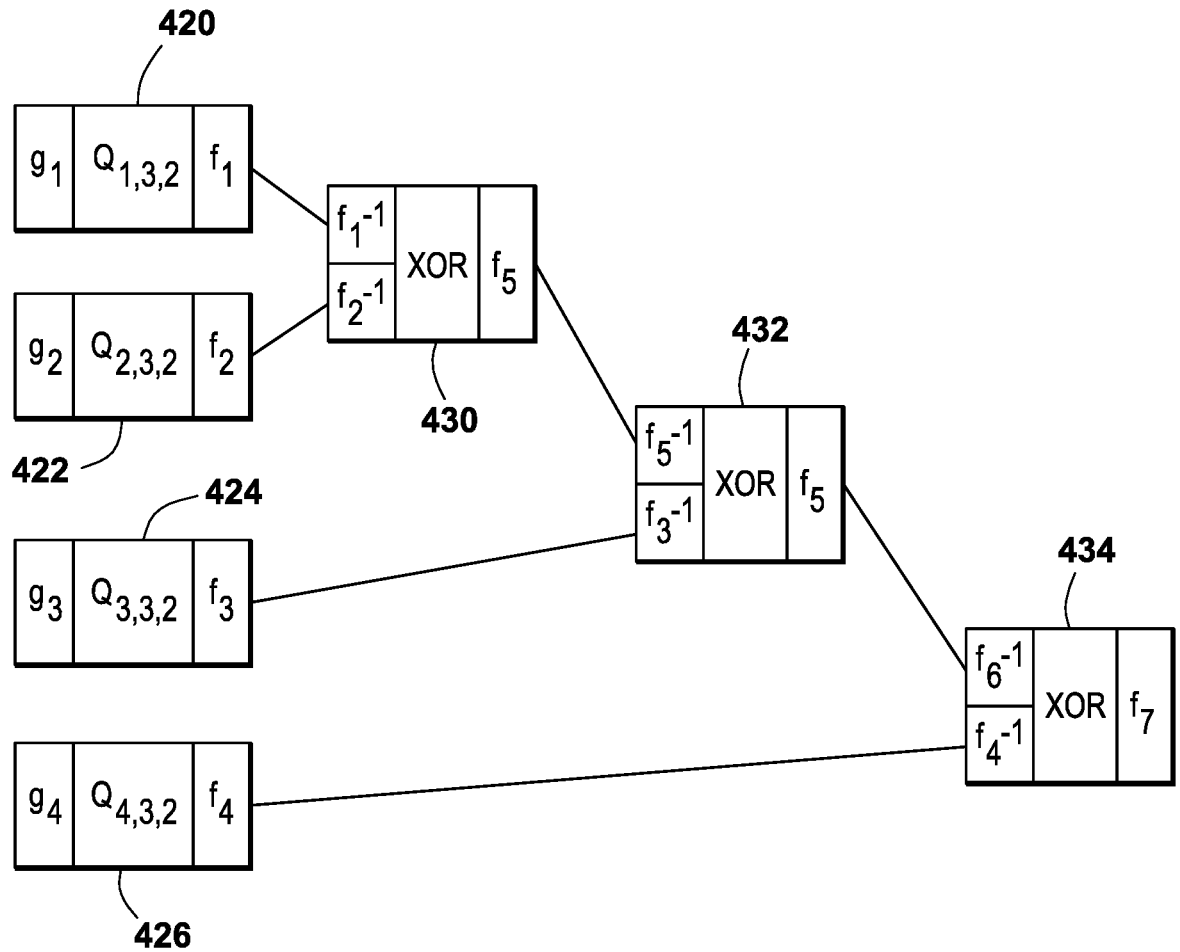
FIG. 7 illustrates a portion of the network tables of FIG. 6 obfuscated by encoding the inputs and outputs.

In the implementation depicted in FIG. 6, the key may easily be extracted from the Q-boxes. Just applying the inverse MixColumns multiplication and the inverse S-box to the output reveals the plain AddRoundKey operation. To prevent this, the input and outputs of all lookup tables are encoded with arbitrary bijective functions. This is described in Chow 1. This means that a lookup table is merged with an encoding function that encodes the output and with a decoding function that decodes the input. The encodings are chosen such that the output encoding of one table matches the input encoding assumed in the next tables. A portion of the implementation of FIG. 6 is depicted in FIG. 7 for the first round. In this example, the input to the round is not encoded in order to be compliant with AES, but the output of the round is encoded. The output encoding is handled in the next round. That is, unlike the first round, the second round (and the later rounds) assumes that the input is encoded. Alternatively, the first round may receive an encoded input. This input encoding must then be applied elsewhere in the software program containing the white-box implementation. Similarly, the last round may or may not include an output encoding depending on whether the output is to be AES compliant. Note that in the white-box implementation obtained, both the lookup tables and the intermediate values are obfuscated.

FIG. 7 illustrates a portion of the network of tables of FIG. 6 obfuscated by encoding the inputs and outputs. The lookup tables 420, 422, 424, 426 correspond to lookup tables 320, 322, 324, 326 of FIG. 6. The inputs of lookup tables 420, 422, 424, 426 are encoded by functions $E_9$, $E_{10}$, $E_{11}$, $E_{12}$, respectively. The outputs of lookup tables 420, 422, 424, 426 are encoded by functions $f_1$, $f_2$, $f_3$, $f_4$ respectively. XOR 430 corresponds to XOR 330. The inputs of XOR 430 decode input using $f_1^{-1}$ and $f_2^{-1}$. The output of XOR 430 is then encoded by function $f_5$. In a similar manner XORs 432, 434 have input decodings and output encodings as illustrated. The output $z_{2,3}$ is encoded using $f_7$. This obfuscation may be applied in either the situation where bytes or nibbles are being used with the Q-boxes.

To implement the embodiments above, it has to be specified how to execute the following 2 steps:

1) deriving the external encoding functions $F_i$, $G_{even}$, $G_{odd}$, H; and
2) merging these external encoding functions with the white-box implementation.

Regarding deriving the various external encoding function, for randomly generated $r_0$, $r_1$, . . . define the following:

$$H(x) = x \oplus r_0$$

$$F_i(x) = x \oplus r_i, \ i = 1, 2, \ldots$$

This results in:

$$F_i(x) \oplus m_j = F_i(x \oplus m_j),$$

which means that the external encoding F may be removed as depicted in FIGS. 2 and 3.

Now, $G_{odd}$ will be derived. In a CMAC computation, the values $k_1$, $k_2$ are computed via $$k_0 = AES_k(0)$$

$$k_1 = \begin{cases} k_0 \ll 1 & \text{if } msb(k_0) = 0 \\ (k_0 \ll 1) \oplus C & \text{if } msb(k_0) = 1 \end{cases}$$

$$k_2 = \begin{cases} k_1 \ll 1 & \text{if } msb(k_1) = 0 \\ (k_1 \ll 1) \oplus C & \text{if } msb(k_1) = 1 \end{cases}$$

Let $msb(r_0) = msb(r_0 \ll 1) = 0$ and let $r'_0 = r_0 \ll 1$ and $r''_0 = r_0 \ll 2$. The output of AES, and thus $k_0$, is encoded by H. Hence, the following may be written:

$$k_0 \oplus r_0 = H \circ AES_k(0)$$

$$k_1 \oplus r'_0 = \begin{cases} (k_0 \oplus r_0) \ll 1 & \text{if } msb(k_0 \oplus r_0) = msb(k_0) = 0 \\ ((k_0 \oplus r_0) \ll 1) \oplus C & \text{if } msb(k_0 \oplus r_0) = msb(k_0) = 1 \end{cases}$$

$$k_2 \oplus r''_0 = \begin{cases} (k_1 \oplus r'_0) \ll 1 & \text{if } msb(k_1 \oplus r'_0) = msb(k_1) = 0 \\ ((k_1 \oplus r'_0) \ll 1) \oplus C & \text{if } msb(k_1 \oplus r'_0) = msb(k_1) = 1 \end{cases}$$

That is, if the computation of $k_0$, $k_1$, $k_2$ is left as is, then applying H to $k_0$ implies that $k_1$ and $k_2$ are masked by $r'_0$ and $r''_0$, respectively. In a standard CRC computation the computation of $k_0$ and $k_1$ is followed by $$m'_n = \begin{cases} m_n \oplus k_1 & \text{if } |m_n| = B \\ \text{padded}(m_n) \oplus k_2 & \text{if } |m_n| < B \end{cases}$$

If this computation is performed with the masked values $k_1 \oplus r'_0$ and $k_2 \oplus r''_0$, the following results:

$$\begin{cases} m'_n \oplus r'_0 & \text{if } |m_n| = B \\ m'_n \oplus r''_0 & \text{if } |m_n| < B \end{cases}$$

This leads to the definition of $G_{even}$ and $G_{odd}$ as follows:

$$G_{even} = \begin{cases} r_{n/2} \oplus r'_0 & \text{if } |m_n| = B \\ r_{n/2} \oplus r''_0 & \text{if } |m_n| < B \end{cases}$$

$$G_{odd} = \begin{cases} r'_0 & \text{if } |m_n| = B \\ r''_0 & \text{if } |m_n| < B \end{cases}$$

Note that the definition of $G_{even}$ includes the removal of $F_{n/2}$.

To complete the embodiment, now it only has to be shown how to integrate the external encodings with the white-box implementation of the encryption block. First consider $F_i$ and H. This 128-bit operation may be split into 16 byte-to-byte operations. That is, the 128-bit Boolean masking may be implemented by performing a Boolean masking operation on each of the 16 bytes. This byte-operation may next be merged with the Q-tables of FIG. 7. In a preferred implementation, the function F is chosen the same for all i. As a result, the same white-box implementations may be reused and an upper bound of n does not need to be known.

Next consider $G_{even}$, $G_{odd}$. These are Boolean masking functions as well, but they apply a different mask depending on whether padding is added. To cope with this, two white-box implementations may be implemented for $G_{even}$: one for the case with padding, and one for the case without padding. The same may be done for $G_{odd}$. Hence, this results in four white-box implementations in total. Alternatively, the approach described in U.S. Pat. No. 9,639,674 entitled "USING SINGLE WHITE-BOX IMPLEMENTATION WITH MULTIPLE EXTERNAL ENCODINGS" may be applied to merge the two white-box implementations of $G_{even}$ or the two of $G_{odd}$, or even to merge all four of the different white-box implementations.

A method according to the embodiments of the invention may be implemented on a computer as a computer implemented method. Executable code for a method according to the invention may be stored on a computer program medium. Examples of computer program media include memory devices, optical storage devices, integrated circuits, servers, online software, etc. Accordingly, a white-box system may include a computer implementing a white-box computer program. Such system, may also include other hardware elements including storage, network interface for transmission of data with external systems as well as among elements of the white-box system.

In an embodiment of the invention, the computer program may include computer program code adapted to perform all the steps of a method according to the invention when the computer program is run on a computer. Preferably, the computer program is embodied on a non-transitory computer readable medium.

Further, because white-box cryptography is often very complicated and/or obfuscated it is tedious for a human to write. It is therefore of advantage to have a method to create the cryptographic system according to the embodiments of the invention in an automated manner.

A method of creating the cryptographic system according to the invention may be implemented on a computer as a computer implemented method, or in dedicated hardware, or in a combination of both. Executable code for a method according to the invention may be stored on a computer program medium. In such a method, the computer program may include computer program code adapted to perform all the steps of the method when the computer program is run on a computer. The computer program is embodied on a non-transitory computer readable medium.

The cryptographic system described herein may be implemented on a user device such as a mobile phone, table, computer, set top box, smart TV, etc. A content provider, such as a television network, video stream service, financial institution, music streaming service, etc., may provide software to the user device for receiving encrypted content from the content provider. That software may have the encryption key embedded therein as described above, and may also include binding strings as described above. Then the content provider may send encrypted content to the user device, which may then decrypt using the supplied software and use the content.

Figure 8:
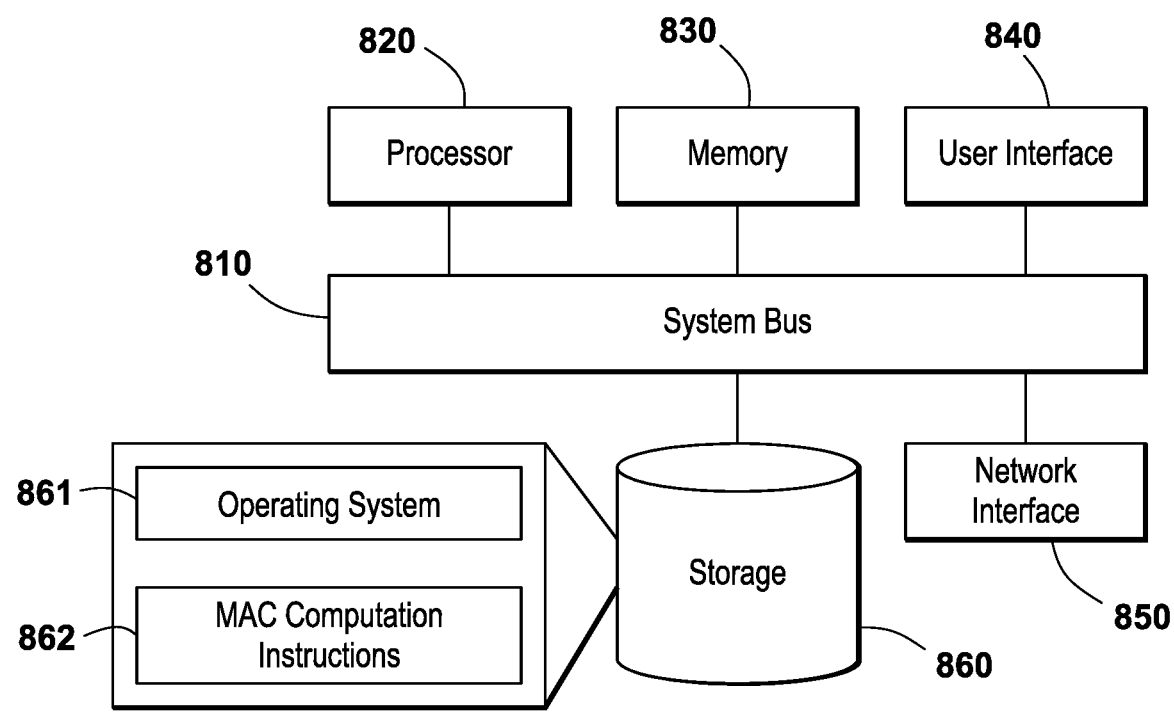
FIG. 8 illustrates a system for providing a user device secure content and a software application that processes the secure content To facilitate understanding, identical reference numerals have been used to designate elements having substantially the same or similar structure and/or substantially the same or similar function.

FIG. 8 illustrates a system for providing a user device secure content and a software application that processes the secure content. The system includes a content server 800, application server 880, user devices 850, 852, and a data network 840. The user devices 850, 852 may request access to secure content provided by the content server 800 via data network 840. The data network can be any data network providing connectivity between the user devices 850, 852 and the content server 800 and application server 880. The user devices 850, 852 may be one of a plurality of devices, for example, set top boxes, media streamers, digital video recorders, tablets, mobile phones, laptop computers, portable media devices, smart watches, desktop computers, media servers, etc.

The user request for access may first require the downloading of a software application that may be used to process the secure content provided by the content server 800. The software application may be downloaded from the application server 880. The software application may be obscured using the techniques described above as well as operate as described above. Once the user devices 850, 852 install the software application, the user device may then download secure content from the content server 800 and access the secure content using the downloaded software application. For example, the downloaded software application may perform decryption of encrypted content received from the content server. In other embodiments, the software application may perform other secure operations, such as for example, encryption, digital signature generation and verification, etc.

The content server 800 may control the access to the secure content provided to the user devices 850, 852. As a result when the content server 800 receives a request for secure content, the content server 800 may transmit the secure content to the requesting user device. Likewise, the application server 820 may control access to the software application provided to the user devices 850, 852. As a result when the content server 820 receives a request for the software application, the application server 820 may transmit the software application to the requesting user device. A user device requesting the software application or secure content may also be authenticated by the respective servers, before providing the software application or secure content to the user device.

The content server 800 may include a processor 802, memory 804, user interface 806, network interface 810, and content storage 812 interconnected via one or more system buses 880. It will be understood that FIG. 8 constitutes, in some respects, an abstraction and that the actual organization of the components of the device 800 may be more complex than illustrated.

The processor 802 may be any hardware device capable of executing instructions stored in memory 804 or storage 812. As such, the processor may include a microprocessor, field programmable gate array (FPGA), application-specific integrated circuit (ASIC), or other similar devices.

The memory 804 may include various memories such as, for example L1, L2, or L3 cache or system memory. As such, the memory 802 may include static random access memory (SRAM), dynamic RAM (DRAM), flash memory, read only memory (ROM), or other similar memory devices.

The user interface 806 may include one or more devices for enabling communication with a user such as an administrator. For example, the user interface 806 may include a display, a mouse, and a keyboard for receiving user commands.

The network interface 810 may include one or more devices for enabling communication with other hardware devices. For example, the network interface 810 may include a network interface card (NIC) configured to communicate according to the Ethernet protocol. Additionally, the network interface 810 may implement a TCP/IP stack for communication according to the TCP/IP protocols. Various alternative or additional hardware or configurations for the network interface 810 will be apparent.

The content storage 812 may include one or more machine-readable content storage media such as read-only memory (ROM), random-access memory (RAM), magnetic disk storage media, optical storage media, flash-memory devices, or similar storage media. In various embodiments, the content storage 812 may store content to be provided to users.

The application server 820 includes elements like those in the content server 800 and the description of the like elements in the content server 800 apply to the application server 820. Also, the content storage 812 is replaced by application storage 832. Further, it is noted that the content server and applications server may be implemented on a single server. Also, such servers may be implemented on distributed computer systems as well as on cloud computer systems.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method for mapping an input message to a message authentication code (MAC) by a white-box implementation of a keyed cryptographic operation in a cryptographic system implemented in a microprocessor and a memory coupled to the microprocessor, the method comprising:

calculating $k_0 = H(E_k(0))$, where H is a first encoding function, $E_k$ is a white-box implementation of a block cipher using a key k;

calculating $k_1 = k_0 \ll 1$ when $msb(k_0) = 0$ or $k_1 = ENC_1(k_0 \ll 1)$ when $msb(k_0) = 1$ where $ENC_1$ is a second encoding function;

calculating $k_2 = k_1 \ll 1$ when $msb(k_1) = 0$ or $k_2 = ENC_2 (k_1 \ll 1)$ when $msb(k_1) = 1$ where $ENC_2$ is a third encoding function;

dividing the input message into h-bit blocks $m = m_1 \| \ldots \| m_{n-1} \| m_n$, where $m_1, \ldots, m_{n-1}$ are complete blocks where b is an integer;

calculating $m_n' = ENC_3(k_1 \oplus m_n)$ when $m_n$ is a complete block and $m_n' = ENC_3(k_2 \oplus (m_n \| 10 \ldots 0_2))$ when $m_n$ is an incomplete block where $ENC_3$ is a fourth encoding function;

calculating $c_i = Encrypt_i(c_{i-1} \oplus m_i)$ for $i = 1, \ldots, n-1$, where $c_0 = 00 \ldots 0_2$, $Encrypt_i(x) = F_{i/2+1}(E_k(x))$ when i is odd or $Encrypt_i(x) = (E_k(F_{i/2+1}^{-1}(x)))$ when i is even, and $F_i$ is a fifth encoding function;

calculating $c_n = E_k(G^{-1}(c_{n-1} \oplus m_n'))$; and outputting the MAC as a portion of $c_n$, wherein the MAC is bound to the white-box implementation of a data processing system.

2. The method of claim 1, wherein $G^{-1}$ compensates for the encoding H when n is odd.

3. The method of claim 1, wherein $G^{-1}$ compensates for the encoding H and encoding $F_{n/2}$ when n is even.

4. The method of claim 1, wherein the XOR in $c_n = E_k(G^{-1}(c_{n-1} \oplus m_n'))$ is implemented in the white-box implementation of $E_k$.

5. The method of claim 1, wherein the XOR in $c_i = Encrypt_i(c_{i-1} \oplus m_i)$ is implemented in the white-box implementation of $E_k$.

6. The method of claim 1, wherein $H(x) = x \oplus r_0$, where $r_0$, is a random number.

7. The method of claim 1, wherein $F_i(x) = x \oplus r_i$, where $r_i$, is a random number.

8. The method of claim 1, wherein when n is even G is $r_{n/2} \oplus R$, where $R = r_0'$ when $m_n$ is a complete block or $R = r_0''$ when $m_n$ is an incomplete block, where $r_0'$ is the masking on $k_1$ due to the encoding H and where $r_0''$ is the masking on $k_2$ due to the encoding H.

9. The method of claim 1, wherein when n is odd G is $r_0'$ when $m_n$ is a complete block or $r_0''$ when $m_n$ is an incomplete block, where $r_0'$ is the masking on $k_1$ due to the encoding H and where $r_0''$ is the masking on $k_2$ due to the encoding H.

10. A cryptographic system for executing a keyed cryptographic operation for mapping an input message to a message authentication code (MAC), the cryptographic system comprising:

a microprocessor and a memory coupled to the microprocessor for:

calculating $k_0 = H(E_k(0))$, where H is a first encoding function, $E_k$ is a white-box implementation of a block cipher using a key k;

calculating $k_1 = k_0 \ll 1$ when $msb(k_0) = 0$ or $k_1 = ENC_1(k_0 \ll 1)$ when $msb(k_0) = 1$ where $ENC_1$ is a second encoding function;

calculating $k_2 = k_1 \ll 1$ when $msb(k_1) = 0$ or $k_2 = ENC_2 (k_1 \ll 1)$ when $msb(k_1) = 1$ where $ENC_2$ is a third encoding function;

dividing the input message into b-bit blocks in $m = m_1 \| \ldots \| m_{n-1} \| m_n$ where $m_1, \ldots, m_{n-1}$ are complete blocks where b is an integer;

calculating $m_n' = ENC_3(k_1 \oplus m_n)$ when $m_n$ is a complete block and $m_n' = ENC_3(k_2 \oplus (m_n \| 10 \ldots 0_2))$ when $m_n$ is an incomplete block where $ENC_3$ is a fourth encoding function;

calculating $c_i = Encrypt_i(c_{i-1} \oplus m_i)$ for $i = 1, \ldots n-1$, where $c_0 = 00 \ldots 0_2$, $Encrypt_i(x) = F_{i/2+1}(E_k(x))$ when i is odd or $Encrypt_i(x) = (E_k(F_{i/2+1}^{-1}(x)))$ when i is even, and $F_i$ is a fifth encoding function;

calculating $c_n = E_k(G^{-1}(c_{n-1} \oplus m_n'))$; and outputting the MAC as a portion of $c_n$ wherein the MAC is bound to the white-box implementation.

11. The cryptographic system of claim 10, wherein $G^{-1}$ compensates for the encoding H when n is odd.

12. The cryptographic system of claim 10, wherein $G^{-1}$ compensates for the encoding H and encoding $F_{n/2}$ when n is even.

13. The cryptographic system of claim 10, wherein the XOR in $c_n = E_k(G^{-1}(c_{n-1} \oplus m_n'))$ is implemented in the white-box implementation of $E_k$.

14. The cryptographic system of claim 10, wherein the XOR in $c_i = \text{Encrypt}_i(c_{i-1} \oplus m_i)$ is implemented in the white-box implementation of $E_k$.

15. The cryptographic system of claim 10, wherein $H(x) = x \oplus r_0$, where $r_0$, is a random number.

16. The cryptographic system of claim 10, wherein $F_i(x) = x \oplus r_i$, where $r_i$, is a random number.

17. The cryptographic system of claim 10, wherein when n is even G is $r_{n/2} \oplus R$, where $R = r_0'$ when $m_n$ is a complete block or $R = r_0''$ when $m_n$ is an incomplete block, where $r_0'$ is the masking on $k_1$ due to the encoding H and where $r_0''$ is the masking on $k_2$ due to the encoding H.

18. The cryptographic system of claim 10, wherein when n is odd G is $r_0'$ when $m_n$ is a complete block or $r_0''$ when $m_n$ is an incomplete block, where $r_0'$ is the masking on $k_1$ due to the encoding H and where $r_0''$ is the masking on $k_2$ due to the encoding H.

* * * * *